(12) United States Patent
Choiniere et al.

(10) Patent No.: US 10,739,454 B2
(45) Date of Patent: Aug. 11, 2020

(54) LOW COST, HIGH ACCURACY LASER WARNING RECEIVER

(71) Applicant: BAE SYSTEMS Information and Electronic Systems Integration Inc., Nashua, NH (US)

(72) Inventors: Michael J. Choiniere, Merrimack, NH (US); Will R. Grigsby, Austin, TX (US); Eric C. Hoenes, Austin, TX (US); Jeffrey L. Jew, Brookline, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 334 days.

(21) Appl. No.: 15/718,064

(22) Filed: Sep. 28, 2017

(65) Prior Publication Data

US 2019/0094362 A1 Mar. 28, 2019

(51) Int. Cl.
| | |
|---|---|
| *G01S 17/08* | (2006.01) |
| *G01S 7/481* | (2006.01) |
| *G01S 7/48* | (2006.01) |
| *G03B 37/04* | (2006.01) |
| *G03B 37/00* | (2006.01) |
| *G03B 3/00* | (2006.01) |

(52) U.S. Cl.
CPC ............ *G01S 17/08* (2013.01); *G01S 7/4804* (2013.01); *G01S 7/4816* (2013.01); *G03B 3/00* (2013.01); *G03B 37/00* (2013.01); *G03B 37/04* (2013.01)

(58) Field of Classification Search
CPC ...... G01S 17/08; G01S 7/4804; G01S 7/4816; G03B 37/00; G03B 37/04; G03B 3/00
See application file for complete search history.

(56) References Cited

U.S. PATENT DOCUMENTS

| | | |
|---|---|---|
| 4,682,024 A | 7/1987 | Halldorsson et al. |
| 4,880,305 A | 11/1989 | Salt |
| 5,260,563 A | 11/1993 | Hunter et al. |
| 5,581,409 A * | 12/1996 | Ruben ................ G01N 21/9054 348/E5.03 |
| 8,817,271 B1 | 8/2014 | Geary |
| 9,671,489 B1 | 6/2017 | Aina et al. |
| 2006/0108499 A1 | 5/2006 | Fortin et al. |

(Continued)

OTHER PUBLICATIONS

Chan, Ching-Yao et al., "Experimental Vehicle Platform for Pedestrian Detection. California Path Program." Aug. 2006, pp. 7. [online] <URL: http://www.dot.ca.gov/newtech/researchreports/reporets/2006/final_report_task_0674.pdf>.

(Continued)

*Primary Examiner* — Eric Bolda
(74) *Attorney, Agent, or Firm* — Davis & Bujold, PLLC; Scott J. Asmus

(57) ABSTRACT

A laser warning receiver system and method having at least four optical components mapped to a photodetector array to provide for omnidirectional detection of incident laser light. In some cases, a fifth optical component is mapped to the central portion of a photodetector array to provide hemispheric detection of laser light. The laser warning receiver system is configured to detect laser light in the NIR, SWIR, MWIR, and/or LWIR range using a single photodetector array and ROIC.

20 Claims, 3 Drawing Sheets

(56) References Cited

U.S. PATENT DOCUMENTS

| | | | |
|---|---|---|---|
| 2008/0036852 A1* | 2/2008 | Toyoda | G02B 13/06 |
| | | | 348/36 |
| 2010/0045773 A1 | 2/2010 | Ritchey | |
| 2013/0070239 A1 | 3/2013 | Crawford et al. | |
| 2014/0168475 A1* | 6/2014 | Corkery | G03B 37/04 |
| | | | 348/239 |
| 2014/0253678 A1* | 9/2014 | Tocher | G03B 37/04 |
| | | | 348/36 |
| 2014/0368814 A1 | 12/2014 | Krupkin et al. | |

OTHER PUBLICATIONS

ESRI, "TruPulse 360, 360 B, or the new 360 R Laser Rangefinder." Product information, Esri, www.esri.com, Aug. 10, 2016, p. 7. [online] <URL: http://wwwesri.com/-/media/Files/Pdfs/partners/hardware/trupulse.pdf>.

International Search Report, PCT/US18/49444, dated Nov. 28, 2018, 11 pages.

* cited by examiner

LOW COST, HIGH ACCURACY LASER WARNING RECEIVER

FIELD OF THE DISCLOSURE

The present disclosure relates to laser warning receivers and more particularly to a low cost, high accuracy laser warning receiver that utilizes a pulse detecting see-spot camera.

BACKGROUND OF THE DISCLOSURE

Conventional laser warning receivers (LWR) typically cover 360° and at least 40° elevation to cover imminent threats from laser range finders (LRF), beam riders, designators/SAL seekers, and the like. The typical approach is to channel the threats by pulse type and divide the field of view (FOV) of the laser warner receiver into about 4 to 8 sections given the limitations of the particular optics. It is not uncommon to have on the order of 36 channeled receivers with A/D processing to cover the 360° FOV.

However, such conventional systems suffer from a number of deficiencies such as size, weight, power consumption, thermal management, cost and accuracy.

SUMMARY OF THE DISCLOSURE

It has been recognized that conventional laser warning receiver systems are large, process heavy, and prone to inaccuracies. One approach of the present disclosure eliminates the need for downstream processing of multiple single quadrate channels and thus provides for an immediate azimuth (Az) and elevation (El) direction of a laser pulse with higher accuracy, smaller volume, and much lower cost than conventional systems.

One aspect of the present disclosure is a laser warning receiver comprising, an active pixel image sensor comprising a read out integrated circuit and a photodetector array configured to detect laser light, wherein the photodetector array has a surface and at least four edges; and at least four optical components, each having a field of view of at least 90 degrees azimuth and 45 degrees elevation, wherein each of the at least four optical components is mapped to a separate portion of the surface of the photodetector array along one of the at least four edges of the photodetector array to provide for omnidirectional detection of incident laser light.

One embodiment of the laser warning receiver further comprises a fifth optical component mapped to a central portion of the surface of the photodetector array and having a field of view of at least 90 degrees to provide hemispheric detection of laser light.

In some cases, the laser light is in the near infrared (NIR), short-wave infrared (SWIR), mid-wave infrared (MWIR), or long-wave infrared (LWIR) range. In certain embodiments, the photodetector array comprises 300×300 pixels.

In one embodiment, the accuracy of laser light detection in azimuth is about 0.25 degrees. In another embodiment, the accuracy of laser light detection in elevation is about 0.45 degrees.

In some cases, the laser warning receiver is five inches in diameter or less. In certain embodiment, the laser warning receiver dissipates less than 2.5 Watts. In other cases, the optical components comprise fold mirrors and lenses.

Another aspect of the present disclosure is a laser warning receiver comprising, an active pixel image sensor comprising a read out integrated circuit and a photodetector array configured to detect laser light, wherein the photodetector array has a surface and at least four edges; at least four optical components, each having a field of view of at least 90 degrees azimuth and 45 degrees elevation, wherein each of the at least four optical components is mapped to a separate portion of the surface of the photodetector array along one of the at least four edges of the photodetector array to provide omnidirectional detection of incident laser light; and a fifth optical component being mapped to a central portion of the surface of the photodetector array and having a field of view of at least 90 degrees to provide for hemispheric detection of incident laser light.

In some cases, the laser light is in the NIR, SWIR, MWIR, or LWIR range. In certain embodiments, the photodetector array comprises 300×300 pixels.

In one embodiment, the accuracy of laser light detection in azimuth is about 0.25 degrees. In another embodiment, the accuracy of laser light detection in elevation is about 0.45 degrees.

In some cases, the laser warning receiver is five inches in diameter or less. In certain embodiment, the laser warning receiver dissipates less than 2.5 Watts. In other cases, the optical components comprise fold mirrors and lenses.

Another aspect of the present disclosure is a method of detecting incident laser light comprising: providing a laser warning receiver comprising, an active pixel image sensor comprising a read out integrated circuit and a photodetector array configured to detect laser light, wherein the photodetector array has a surface and at least four edges; and at least four optical components, each having a field of view of at least 90 degrees azimuth and 45 degrees elevation, wherein each of the at least four optical components is mapped to a separate portion of the surface of the photodetector array along one of the at least four edges of the photodetector array to provide omnidirectional detection of incident laser light; detecting, with the photodetector array, incident laser light captured by the at least for optical components; merging direction information, with the read out integrated circuit, wherein the direction information was captured by the at least four optical components and was mapped to the separate portions of the photodetector array to provide omnidirectional laser light detection; and providing, to an operator, the direction information for the incident laser light, wherein the direction information comprises azimuth and elevation information.

One embodiment of the method further comprises a fifth optical component being mapped to a central portion of the surface of the photodetector array and having a field of view of at least 90 degrees to provide for hemispheric detection of incident laser light.

In some cases, the merging of direction information captured by the five optical components provides for hemispheric laser light detection.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 2:
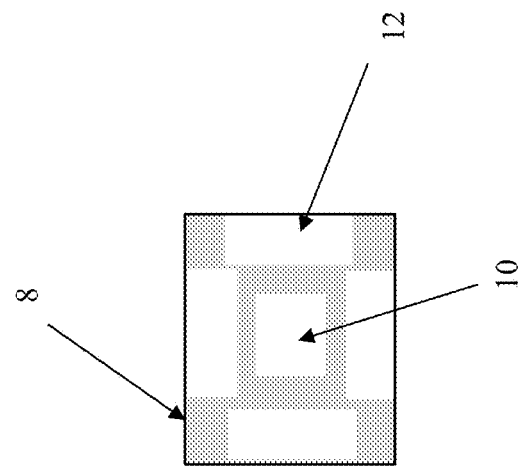
FIG. 2 shows one embodiment of the array of the laser warning receiver system of the present disclosure.

Conventional threat warning receivers provide quadrant coverage and are made up of several independent sensors, each requiring substantial processing. The individual subsystems cover a quadrant, typically using a PIN diode. The subsystems have wide field of view (FOV) optics (e.g., 90 degrees), and require band pass filtering to remove unwanted scene energy. Each sensor requires A/D conversion and that requires significant processing support to identify the location of an incident laser pulse.

To solve the drawbacks of conventional systems, one approach of the present disclosure utilizes a pulse detecting see-spot camera to detect an incident laser while combing channels from four or more optical components. A see-spot camera is a type of imaging sensor that is sensitive to the wavelength of a laser designator such that the imaging sensor is able to directly image the spot designated by the laser. The see-spot camera is able to more easily image within an operational scene as well as have improved sensitivity in challenging environments. The energy detection mechanism in one embodiment is in the (read out integrated circuit) ROIC of the imager.

A ROIC is a type of integrated circuit specifically used for reading detectors of a specific type. ROIC are compatible with different types of detectors such as infrared and ultraviolet. The primary purpose for ROICs is to accumulate the photocurrent from each pixel for imagery while detecting high frequency signal (laser puke) in the embedded analogy pixel circuitry and then transfer the resultant signal-image and pulse detection flag onto output taps for readout. Conventional ROIC technology stores the signal charge at each pixel and then routes the signal onto output taps for readout. This requires storing large signal charge at each pixel site and maintaining signal-to-noise ratio (or dynamic range) as the signal is read out and digitized.

In certain embodiments of the laser warning receiver of the present disclosure, the detection arrays can be in the SWIR band (e.g., InGaAs), the NIR band (e.g., Silicon), or the like. These arrays can be optically mapped to 360 degree, hemispherical coverage for the detection of threat lasers. The system can be used to detect laser range finders (LRF), designators for guided SAL seekers, beam riders for anti-tank missiles, and the like.

The system can be used to detect semi-active laser technology. With this technique, a laser is pointed at a target and the laser radiation bounces off the target and is scattered in all directions. A munition is launched or dropped somewhere near the target. When it is close enough for some of the reflected laser energy from the target to reach it, a laser seeker detects which direction this energy is coming from and adjusts the munition trajectory towards the source. While the munition is in the general area and the laser is kept aimed at the target, the munition should be guided accurately to the target. In one embodiment of the present disclosure the reflected laser energy could be captured by the four or more optical components and the location of the source of the energy could be accurately detected.

In certain embodiments of the system, the system cost includes an imaging sensor, such as the see-spot sensor and at least four wide FOV optics. This provides an omnidirectional laser warning receiver. The addition of a fifth wide FOV optic provides for a hemispheric laser warning receiver. The LWR system can detect the energy emitted by LRFs, designators, and beam rider lasers, as well as both pulse and quasi continuous wave (CW) lasers.

With such a low material cost, the system is envisioned as part of ground and air protection suites. The laser detection in the pixel/photodetector array has a narrow pixel instantaneous field of view (IFOV) of about 8 mrads and thus reduces the need for scene filtering (e.g., band pass filtering). The handoff accuracy is less than about 0.25 degrees, in both azimuth and elevation. The number of pixels across the FOV provides detection and high angle handoff accuracy to any counter threat system. For example, accuracy is in the range of 100°/200 pixels and +/−0.25° Azimuth/Elevation.

One potential application of the system of the present disclosure is mounted on a ground vehicle. The system is compact and fits in a small package and provides a 5:1 savings over conventional systems making it possible to use in many situations. The system detects incident laser energy in a variety of wavelengths and provides accurate location in Az and El in an omnidirectional manner (e.g., four optical components), or hemispheric manner (e.g., five optical components).

Figure 1:
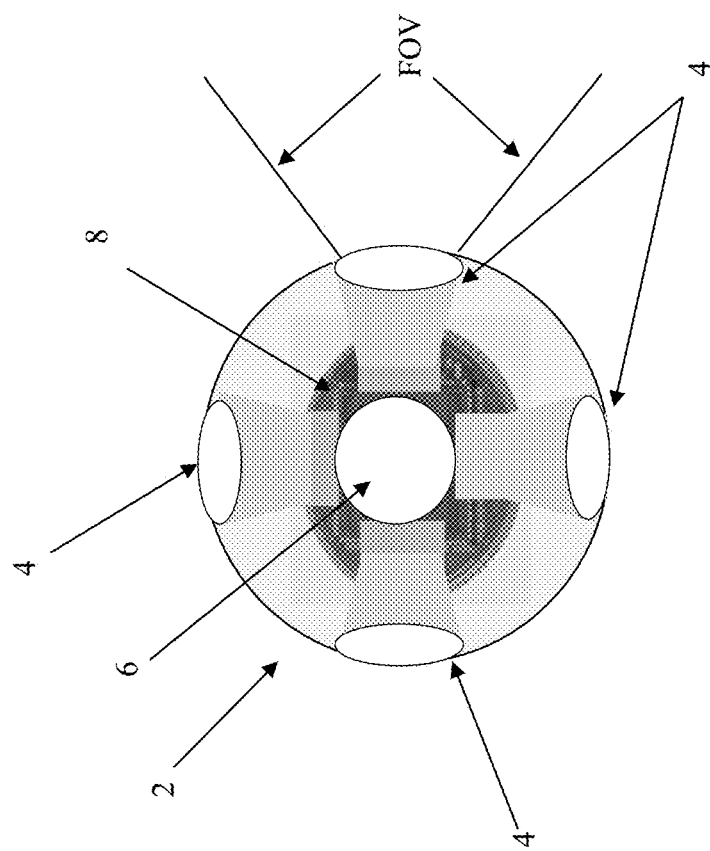
FIG. 1 shows a top diagrammatic view of one embodiment of the laser warning receiver system of the present disclosure.

Referring to FIG. 1, a top diagrammatic view of one embodiment of the laser warning receiver system 2 of the present disclosure is shown. More specifically, a photodetector array 8 comprises a plurality of pixels used to detect input from wide FOV optics 4, 6. There are at least four wide angle optics 4 that are located around the perimeter of the laser warning receiver 2 to cover the total 360°, which may include some overlap. In certain embodiments, there is a fifth optic 6 that is used to cover a different view. When used on a ground vehicle it would be looking up. When mounted on an aircraft, such as a helicopter or plane, it would be looking down. The use of the fifth optic thus provides a hemispheric view of incoming laser energy all mapped to a single 2D array using a single processor. In some cases the Az FOV for each optic is about 100°. In certain embodiments, each optical component is configured to capture 45° El FOV. In some embodiments of the laser warning receiver of the present disclosure, the entrance aperture is greater than about 1 cm$^2$. In another embodiment the optics are light pipes used to direct the incoming signals.

In one example the laser warning receiver system 2 is mounted to a vehicle such as an aircraft, drone, helicopter, ship or ground vehicle. In the aircraft example, the primary imaging would be a full 360 degrees along the azimuth provided by the 4 wide-angle optical components 4 as well as some view of elevation. A fifth optic 6 would be deployed and directed towards the ground and provide elevation coverage. If the system was deployed on a ship or ground vehicle, the fifth optic would be directed towards the sky.

Referring to FIG. 2, one embodiment of the array of the laser warning receiver system of the present disclosure is shown. More particularly, the photodetector array 8 is mapped for the optics 10, 12. In some cases, the array is 300×300 pixels. In some cases the perimeter areas 12 are about 200×50 pixels. For this example, the photodetector array is mapped such that the accuracy for 100°/200 is about +/−0.25° Az and for 45°/50 pixels is about 0.45° El. Using a fifth channel on the top provides for hemispheric laser detection. It is understood that greater number of pixels provides for even greater accuracy. As the arrays become larger, resolution increases proportional to the number of pixels. Laser detection capable photodetector arrays are just becoming commercially available and as the type (band) and format sizes vary optical systems can provide coverage from 1 degree to 100 μrads depending on the array size.

In certain embodiments, the array size ranges from about 100 pixels$^2$ to about 2000 pixels$^2$. In some cases, the array size is about 200 pixels$^2$, about 300 pixels$^2$, about 400 pixels$^2$, about 500 pixels$^2$, or about 600 pixels$^2$. In some cases, the array size is about 700 pixels$^2$, about 800 pixels$^2$, about 900 pixels$^2$, or about 1000 pixels$^2$. In some cases, the array size is about 1100 pixels$^2$, about 1200 pixels$^2$, about 1300 pixels$^2$, about 1400 pixels$^2$, or about 1500 pixels$^2$. In some cases, the array size is about 1600 pixels$^2$, about 1700 pixels$^2$, about 1800 pixels$^2$, about 1900 pixels$^2$, or about 2000 pixels$^2$. In yet other embodiments, the array is not square, but rectangular or polygonal. Essentially, the choice of array is not limited, but at some resolution cost becomes a factor.

In certain embodiments the pixels of the photodetector array 8 are similar and responsive to the same signals. In other embodiments the pixels of the photodetector array are different such that the sensitivity and image processing capabilities for the optics are different.

Figure 3:
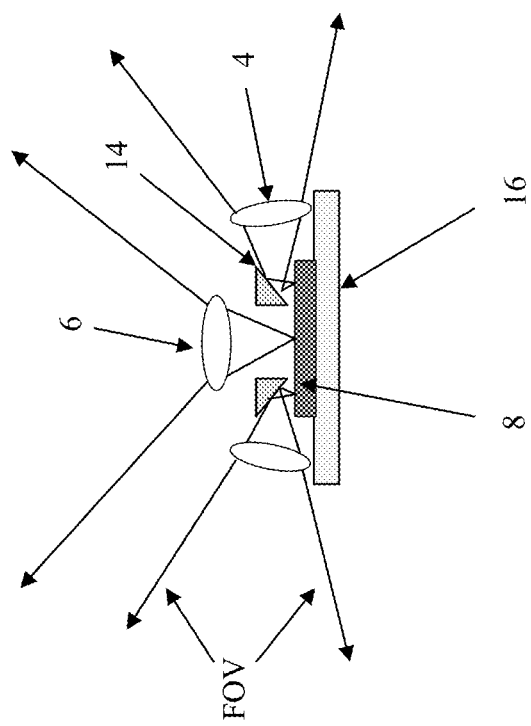
FIG. 3 shows a side diagrammatic view of one embodiment of the laser warning receiver system of the present disclosure.

Referring to FIG. 3, a side diagrammatic view of one embodiment of the laser warning receiver system of the present disclosure is shown. More specifically, a photodetector array 8 is used on a ROIC 16. A series of lenses 4 are placed around a perimeter of the array 8 to focus incoming light. By using fold mirrors 14 the laser light can be mapped onto the surface of the ROIC 16 to provide an omnidirectional laser warning receiver. Each optical component 4 provides for quadrant coverage. A fifth wide FOV optic 6 is used to complete the hemispheric data collection related to detected laser light. Filters (not shown) may also be used to filter out extraneous signals and interferes while allowing the signals of interest to pass through. Here, each channel from the plurality of optical components is mapped onto a single array, which uses a single processor, to obtain omnidirectional or hemispheric detection.

Figure 4:
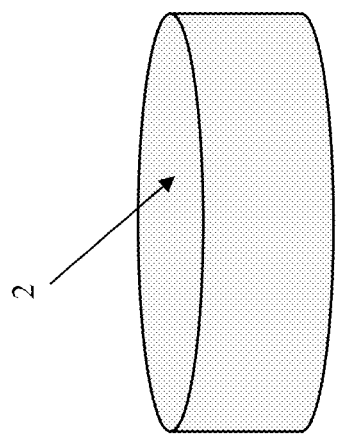
FIG. 4 shows one embodiment of the package for the laser warning receiver system of the present disclosure.

Referring to FIG. 4, one embodiment of the package for the laser warning receiver system of the present disclosure is shown. More particularly, in certain embodiments of laser warning receiver system of the present disclosure, the complete omnidirectional receiver will measure about five inches in diameter and about one and a half inches high. The system of the present disclosure provides a size and weight reduction of about 10× and cost reduction by about 5×. In some cases the size may be even smaller.

In one embodiment, the system dissipates less than 2.5 watts. In some cases, the system reduces the power levels by 10× over a traditional system utilizing A/D for each quadrant system.

Figure 5:
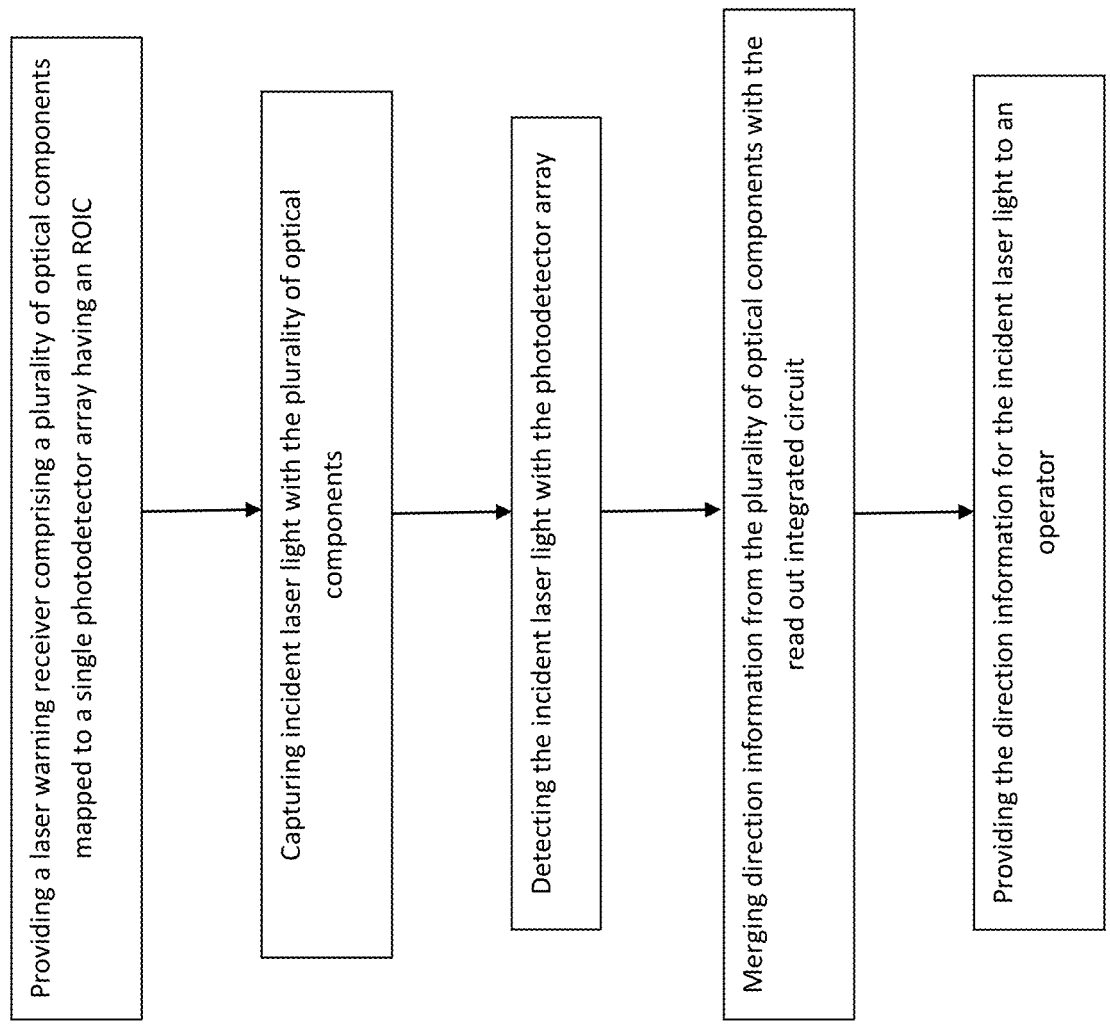
FIG. 5 shows a flow chart of one embodiment of the method of the present disclosure.

Referring to FIG. 5, a flowchart of one embodiment of the method of the present disclosure is shown. More specifically, a laser warning receiver is provided having an active pixel image sensor comprising a read out integrated circuit and a photodetector array configured to detect laser light, wherein the photodetector array has a surface and at least four edges; and at least four optical components, each having a field of view of at least 90 degrees azimuth and 45 degrees elevation, wherein each of the at least four optical components is mapped to a separate portion of the surface of the photodetector array along one of the at least four edges of the photodetector array to provide omnidirectional detection of incident laser light. The photodetector array detects incident laser light captured by the at least for optical components and the read out integrated circuit merges direction information captured by the at least four optical components. By mapping the separate channels to the separate portions of the photodetector array omnidirectional laser light detection is possible. When in use, the direction information for the incident laser light is provided to an operator so they can take an action. In some cases that action might include countermeasures or a change position to avoid detection by the incident laser light.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A laser warning receiver comprising,
   an active pixel image sensor comprising a read out integrated circuit and a photodetector array configured to detect laser light, wherein the photodetector array has a surface and at least four edges, and wherein the active pixel image sensor is a pulse detecting see-spot camera;
   at least four optical components, each having a field of view of at least 90 degrees azimuth and 45 degrees elevation, wherein each of the at least four optical components is mapped to a separate portion of the surface of the photodetector array along one of the at least four edges of the photodetector array to provide omnidirectional detection of incident laser light, and wherein each of the at least four optical components is a lens.

2. The laser warning receiver of claim 1, further comprising a fifth optical component mapped to a central portion of the surface of the photodetector array and having a field of view of at least 90 degrees elevation to provide for the hemispheric detection of incident laser light.

3. The laser warning receiver of claim 1, wherein the laser light is in the NIR, SWIR, MWIR, or LWIR range.

4. The laser warning receiver of claim 1, wherein the photodetector array comprises 300×300 pixels.

5. The laser warning receiver of claim 1, wherein the accuracy of laser light detection in azimuth is about 0.25 degrees.

6. The laser warning receiver of claim 1, wherein the accuracy of laser light detection in elevation is about 0.45 degrees.

7. The laser warning receiver of claim 1, wherein the laser warning receiver has a cylindrical shape and is five inches in diameter or less.

8. The laser warning receiver of claim 1, wherein the at least four optical components comprise fold mirrors.

9. The laser warning receiver of claim 1, wherein the laser warning receiver dissipates less than 2.5 Watts.

10. A laser warning receiver comprising,
    an active pixel image sensor comprising a read out integrated circuit and a photodetector array configured to detect incident laser light, wherein the photodetector array has a surface and at least four edges, and wherein the active pixel image sensor is a pulse detecting see-spot camera;
    at least four optical components, each having a field of view of at least 90 degrees azimuth and 45 degrees elevation, wherein each of the at least four optical components is mapped to a separate portion of the surface of the photodetector array along one of the at least four edges of the photodetector array to provide omnidirectional detection of incident laser light, and wherein each of the at least four optical components is a lens; and
    a fifth optical component being mapped to a central portion of the surface of the photodetector array and having a field of view of at least 90 degrees elevation to provide for hemispheric detection of incident laser light.

11. The laser warning receiver of claim 10, wherein the photodetector array comprises 300×300 pixels.

12. The laser warning receiver of claim 10, wherein the accuracy of laser light detection in azimuth is about 0.25 degrees.

13. The laser warning receiver of claim 10, wherein the accuracy of laser light detection in elevation is about 0.45 degrees.

14. The laser warning receiver of claim 10, wherein the laser warning receiver has a cylindrical shape and is five inches in diameter or less.

15. The laser warning receiver of claim 10, wherein the at least four optical components comprise fold mirrors.

16. The laser warning receiver of claim 10, wherein the laser warning receiver dissipates less than 2.5 Watts.

17. A method of detecting incident laser light comprising:
    providing a laser warning receiver comprising,
        an active pixel image sensor comprising a read out integrated circuit and a photodetector array configured to detect laser light, wherein the photodetector array has a surface and at least four edges, and wherein the active pixel image sensor is a pulse detecting see-spot camera;
        at least four optical components, each having a field of view of at least 90 degrees azimuth and 45 degrees elevation, wherein each of the at least four optical components is mapped to a separate portion of the surface of the photodetector array along one of the at least four edges of the photodetector array to provide omnidirectional detection of incident laser light, and wherein each of the at least four optical components is a lens;
    detecting, with the photodetector array, incident laser light captured by the at least four optical components;
    merging direction information, with the read out integrated circuit, wherein the direction information was captured by the at least four optical components and was mapped to the separate portions of the photodetector array to provide omnidirectional laser light detection; and
    providing, to an operator, the direction information for the incident laser light, wherein the direction information comprises azimuth and elevation information.

18. The method of claim 17, further comprising a fifth optical component being mapped to a central portion of the surface of the photodetector array and having a field of view of at least 90 degrees elevation to provide for hemispheric detection of incident laser light.

19. The method of claim 18, wherein the merging of direction information captured by the five optical components provides for hemispheric laser light detection.

20. The laser warning receiver of claim 1, wherein each separate portion of the surface of the photodetector array comprises a perimeter area of pixels wherein each perimeter area of pixels do not overlap.

* * * * *